United States Patent
Hsu et al.

(10) Patent No.: US 11,201,022 B2
(45) Date of Patent: Dec. 14, 2021

(54) KEY STRUCTURE

(71) Applicants: LITE-ON ELECTRONICS (GUANGZHOU) LIMITED, Guangzhou (CN); Lite-On Technology Corporation, Taipei (TW)

(72) Inventors: Kuo-Hui Hsu, Taipei (TW); Cheng-Kun Liao, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/872,364

(22) Filed: May 11, 2020

(65) Prior Publication Data
US 2020/0373098 A1 Nov. 26, 2020

Related U.S. Application Data

(60) Provisional application No. 62/849,961, filed on May 20, 2019.

(30) Foreign Application Priority Data

Mar. 27, 2020 (CN) .......................... 202010228409.4

(51) Int. Cl.
*H01H 13/84* (2006.01)
*H01H 3/12* (2006.01)
(Continued)

(52) U.S. Cl.
CPC ........... *H01H 13/84* (2013.01); *G02B 6/0028* (2013.01); *G02B 6/0055* (2013.01); *H01H 3/125* (2013.01);
(Continued)

(58) Field of Classification Search
CPC ...... H01H 3/125; H01H 13/705; H01H 13/83; H01H 13/84
See application file for complete search history.

(56) References Cited

U.S. PATENT DOCUMENTS 5,823,325 A * 10/1998 Lin ........................ H01H 3/125
200/344
6,020,566 A * 2/2000 Tsai ........................ H01H 3/122
200/344
(Continued)

FOREIGN PATENT DOCUMENTS

CN 201845686 5/2011

OTHER PUBLICATIONS

"Office Action of China Counterpart Application", dated Sep. 28, 2021, p. 1-p. 6.

*Primary Examiner* — Kyung S Lee
(74) *Attorney, Agent, or Firm* — JCIPRNET

(57) ABSTRACT

The disclosure provides a key structure including a base plate, a keycap, and a compressible supporting mechanism. The keycap is disposed above the base plate. The keycap has a top surface and a bottom surface opposite to each other and includes a bonding member protruding from the base surface. The bonding member has a groove and a guiding surface. The compressible supporting mechanism is disposed between the base plate and the keycap. The compressible supporting mechanism is assembled into the groove as being guided by the guiding surface. In the key structure provided by the disclosure, since the compressible supporting mechanism is guided by the guiding surface, interference generated when the compressible supporting mechanism and the keycap are assembled may be reduced, so that the bonding member is prevented from being damaged or collapsing when being pressed in a process of assembling.

8 Claims, 12 Drawing Sheets

(51) Int. Cl.
*H01H 13/83* (2006.01)
*H01H 13/705* (2006.01)
*F21V 8/00* (2006.01)

(52) U.S. Cl.
CPC .......... *H01H 13/83* (2013.01); *H01H 13/705* (2013.01); *H01H 2219/044* (2013.01); *H01H 2219/06* (2013.01); *H01H 2219/0621* (2013.01); *H01H 2239/004* (2013.01)

(56) References Cited

U.S. PATENT DOCUMENTS

| | | | |
|---|---|---|---|
| 9,773,626 B1* | 9/2017 | Wang | H01H 13/705 |
| 9,941,072 B1* | 4/2018 | Chen | H01H 13/14 |
| 2002/0139841 A1* | 10/2002 | Hsu | H01H 3/125 |
| | | | 235/375 |
| 2004/0074753 A1* | 4/2004 | Chen | H01H 3/125 |
| | | | 200/344 |
| 2009/0133999 A1* | 5/2009 | Yamada | H01H 3/125 |
| | | | 200/345 |
| 2014/0001021 A1* | 1/2014 | Zhang | H01H 3/125 |
| | | | 200/5 C |
| 2017/0062151 A1* | 3/2017 | Iso | H01H 3/125 |
| 2017/0162345 A1* | 6/2017 | Jhuang | H01H 13/14 |
| 2017/0352504 A1* | 12/2017 | Chen | H01H 13/83 |
| 2018/0040438 A1* | 2/2018 | Chen | H01H 3/125 |
| 2018/0277318 A1* | 9/2018 | Wu | H01H 13/04 |
| 2018/0308647 A1* | 10/2018 | Liu | H01H 13/14 |
| 2019/0013160 A1* | 1/2019 | Cheng | H01H 13/14 |
| 2019/0096604 A1* | 3/2019 | Yen | H01H 13/705 |
| 2019/0228930 A1* | 7/2019 | Lin | H01H 13/023 |
| 2019/0378666 A1* | 12/2019 | Wang | H01H 13/14 |

* cited by examiner

KEY STRUCTURE

CROSS-REFERENCE TO RELATED APPLICATION

This application claims the priority benefits of U.S. provisional application Ser. No. 62/849,961, filed on May 20, 2019, and China application serial no. 202010228409.4, filed on Mar. 27, 2020. The entirety of each of the above-mentioned patent applications is hereby incorporated by reference herein and made a part of this specification.

BACKGROUND

Technical Field

The disclosure relates to a key structure, and in particular, relates to a key structure in which interference generated due to assembly of a compressible supporting mechanism and a keycap is reduced.

Description of Related Art

A keyboard is a common physical input interface for assisting a user to operate or input a signal to an electronic apparatus such as a personal desktop computer, a notebook computer, a tablet, or other electronic products equipped with keyboards or external keyboards. Specifically, in a keyboard, a compressible supporting mechanism may be configured to support a keycap and ensures that the keycap moves back and forth relative to a base plate in a specific direction. Generally, a connection structure is disposed at the inner side surface of the keycap, so that the keycap may be assembled with the compressible supporting mechanism. Nevertheless, in the assembly process, considerable interference may be easily generated between the connection structure of the keycap and the compressible supporting mechanism, such that the connection structure of the keypad may be damaged or collapse when being pressed.

SUMMARY

The disclosure provides a key structure capable of reducing interference generated when a compressible supporting mechanism and a keycap are assembled and exhibiting favorable structural reliability.

According to an embodiment of the disclosure, a key structure includes a base plate, a keycap, and a compressible supporting mechanism. The keycap is disposed above the base plate. The keycap has a top surface and a bottom surface opposite to each other and includes a bonding member protruding from the base surface. The bonding member has a groove and a guiding surface. The compressible supporting mechanism is disposed between the base plate and the keycap. The compressible supporting mechanism is assembled into the groove as being guided by the guiding surface.

In the key structure according to an embodiment of the disclosure, the guiding surface includes a bevel surface or a round surface. In the key structure according to an embodiment of the disclosure, the compressible supporting mechanism includes a scissors-leg assembly, and the scissors-leg assembly includes a first leg and a second leg pivotally connected to each other. The first leg is located inside the second leg, and a first side of the first leg and a third side of the second leg are connected to the base plate.

In the key structure according to an embodiment of the disclosure, the bonding member is a fixing member, and a second side of the first leg is assembled into the groove as being guided by the guiding surface.

In the key structure according to an embodiment of the disclosure, the bonding member is a slidable connecting member, and a fourth side of the second leg is assembled into the groove as being guided by the guiding surface.

In the key structure according to an embodiment of the disclosure, the bonding member includes a fixing member and a slidable connecting member. The slidable connecting member and the fixing member are respectively located at two opposite sides of the keycap. The groove includes a first groove and a second groove. The guiding surface includes a first guiding surface and a second guiding surface. The fixing member has the first groove and the first guiding surface. The slidable connecting member has the second groove and the second guiding surface. A second side of the first leg is assembled into the groove as being guided by the guiding surface. A fourth side of the second leg is assembled into the second groove as being guided by the second guiding surface.

In the key structure according to an embodiment of the disclosure, the compressible supporting mechanism further includes a balancing bar, and the bonding member further includes a positioning member. The positioning member is closer to an edge of the keycap than the fixing member. the groove further includes a third groove, and the guiding surface further includes a third guiding surface. The positioning member has the third groove and the third guiding surface. The balancing bar is assembled into the third groove as being guided by the third guiding surface.

In the key structure according to an embodiment of the disclosure, the compressible supporting mechanism is a balancing bar, and the bonding member is a positioning member.

In the key structure according to an embodiment of the disclosure, the guiding surface includes two guiding surfaces, and a distance between the two guiding surfaces gradually increases in a direction away from the groove.

In the key structure according to an embodiment of the disclosure, a thin-film circuit board and an elastic body are further included. The thin-film circuit board is disposed on the base plate 130. The elastic body penetrates through the compressible supporting mechanism and is disposed between the keycap and the thin-film circuit board.

To sum up, in the key structure provided by the disclosure, the keycap includes the bonding member protruding from the bottom surface. Since the bonding member has the groove and the guiding surface, the compressible supporting mechanism may be assembled into the groove as being guided by the guiding surface. That is, in the process of assembling, the compressible supporting mechanism is guided by the guiding surface, so interference generated when the compressible supporting mechanism and the keycap are assembled may be reduced, so that the bonding member is prevented from being damaged or collapsing when being pressed. In this way, the key structure provided by the disclosure may exhibit favorable structural reliability.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated

DESCRIPTION OF THE EMBODIMENTS

Figure 1A:
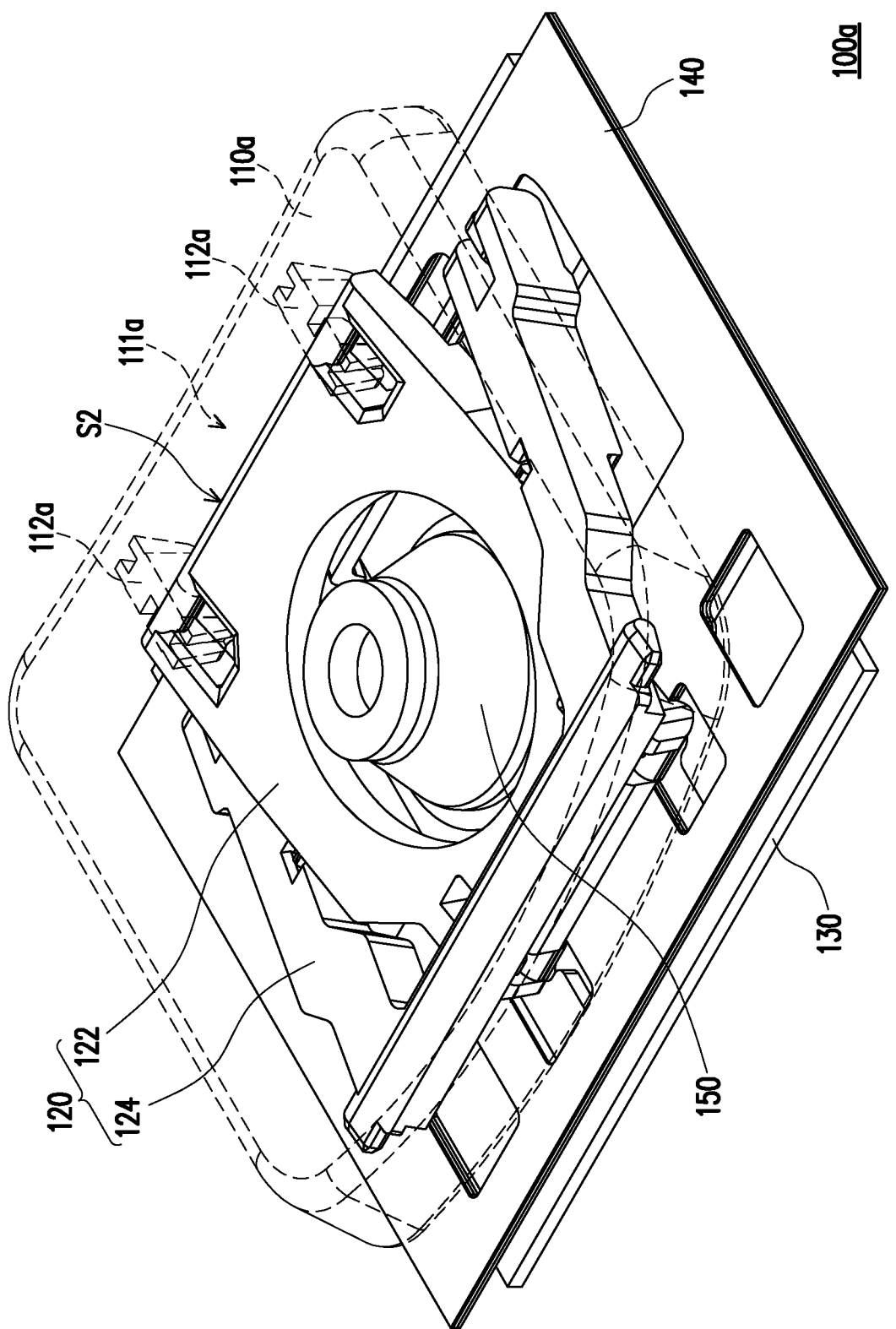
FIG. 1A is a schematic three-dimensional view of a key structure according to an embodiment of the disclosure.

Descriptions of the disclosure are given with reference to the exemplary embodiments illustrated by the accompanying drawings. Wherever possible, the same reference numbers are used in the drawings and the description to refer to the same or like parts.

Figure 1B:
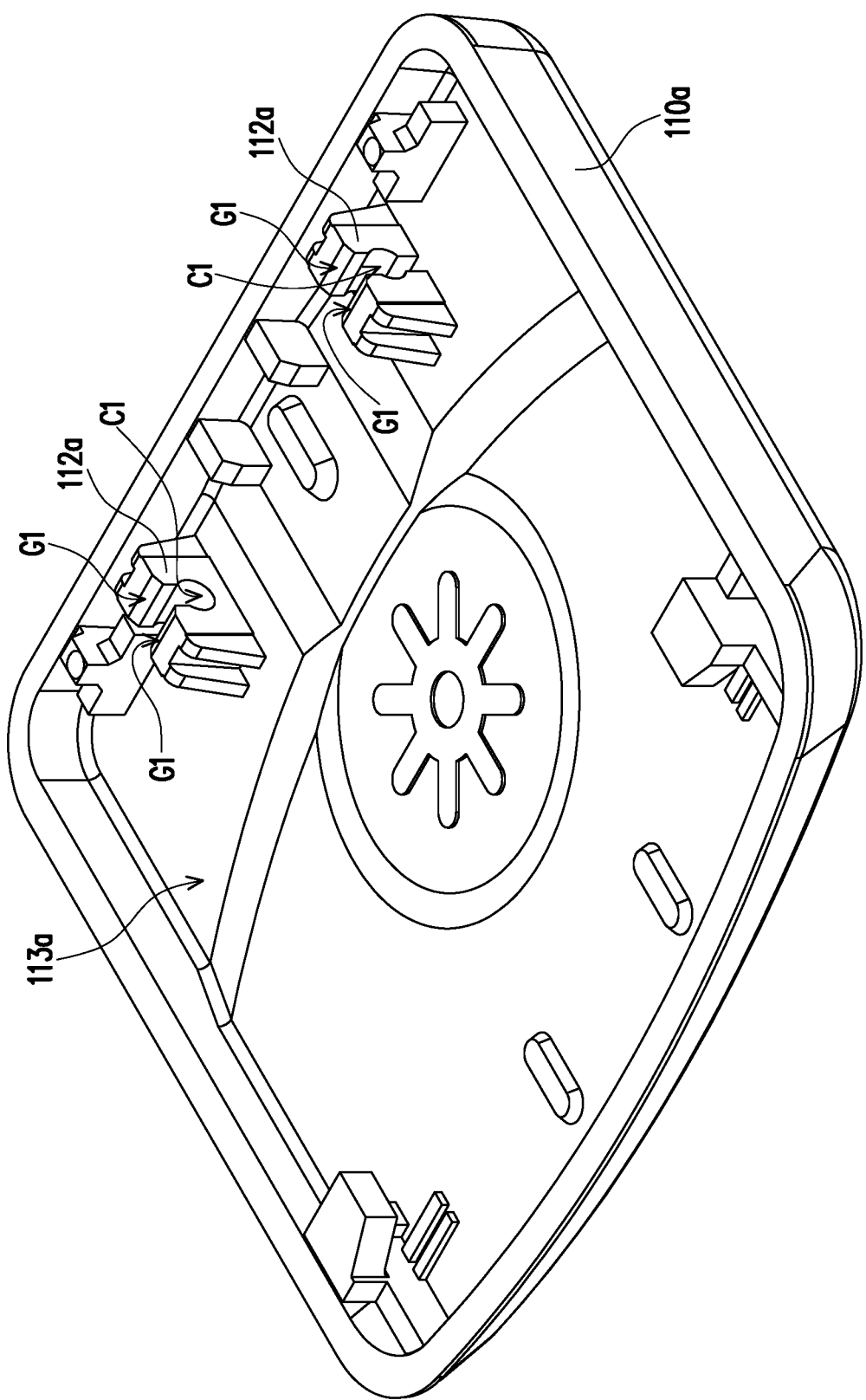
FIG. 1B is a schematic three-dimensional view of a keycap of the key structure of FIG. 1A.
Figure 1C:
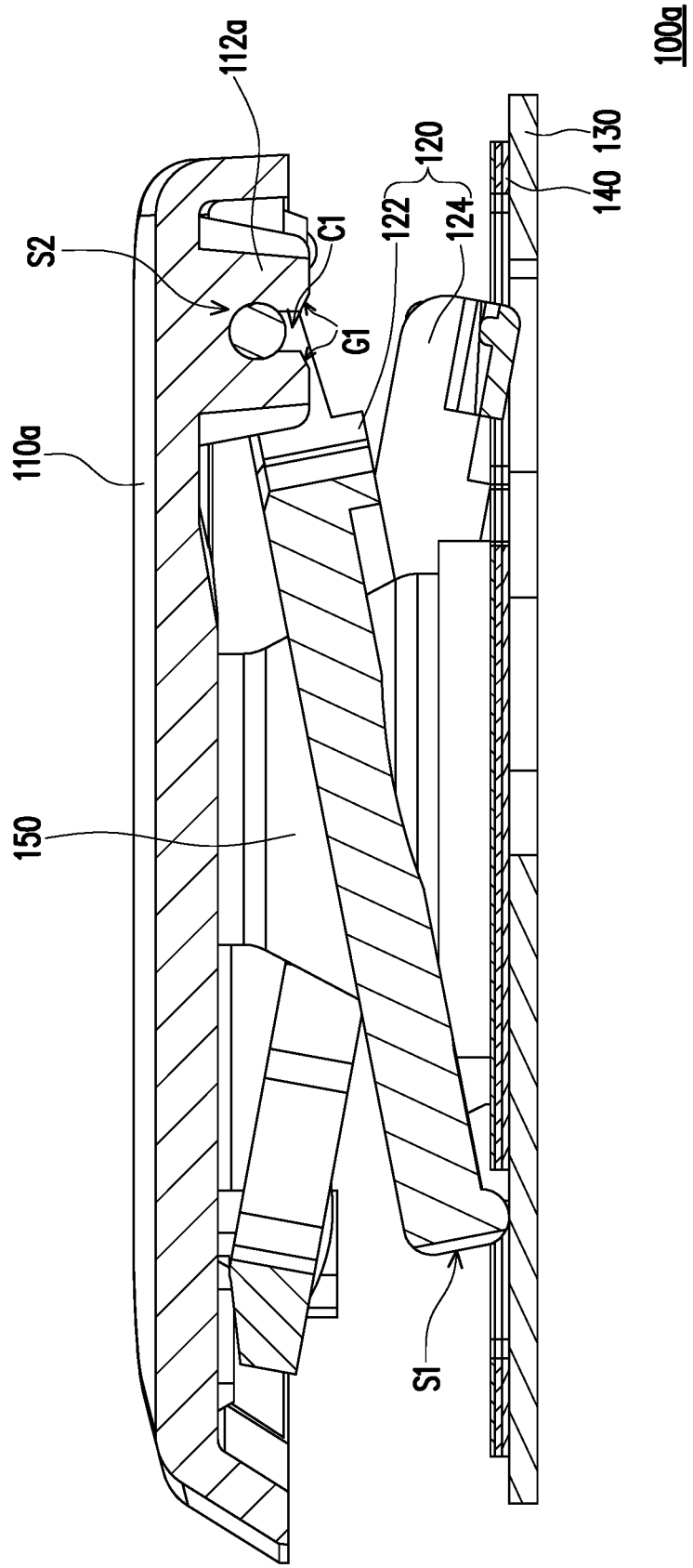
FIG. 1C is a schematic cross-sectional view of the key structure of FIG. 1A.

FIG. 1A is a schematic three-dimensional view of a key structure according to an embodiment of the disclosure. FIG. 1B is a schematic three-dimensional view of a keycap of the key structure of FIG. 1A. FIG. 1C is a schematic cross-sectional view of the key structure of FIG. 1A. For the convenience of the description, the keycap in FIG. 1A is illustrated in dotted lines.

With reference to FIG. 1A, FIG. 1B, and FIG. 1C, in this embodiment, a key structure 100a includes a keycap 110a, a compressible supporting mechanism, and a base plate 130. The keycap 110a is disposed above the base plate 130. The keycap 110a has a top surface 111a (may be treated as an outer side surface) and a bottom surface 113a (may be treated as an inner side surface) opposite to each other and includes a bonding member protruding from the bottom surface 113a, where the bonding member has a groove C1 and a guiding surface G1. The compressible supporting mechanism is disposed between the base plate 130 and the keycap 110a. In particular, the compressible supporting mechanism is assembled into the groove C1 as being guided by the guiding surface G1.

In detail, the bonding member of this embodiment is used as a fixing member 112a, and the guiding surfaces G1 are located at two sides of the groove C1. Further, the compressible supporting mechanism of this embodiment may be a scissors-leg assembly 120 including a first leg 122 and a second leg 124 pivotally connected to each other. The first leg 122 is located inside the second leg 124, that is, the first leg 122 is an inner blade, and the second leg 124 is an outer blade. A first side S1 of the first leg 122 is connected to the base plate 130, and a second side S2 of the first leg 122 is assembled into the groove C1 as being guided by the two guiding surfaces G1 of each fixing member 112a. That is, when the scissors-leg assembly 120 and the keycap 110a are assembled, the second side S2 of the first leg 122 contacts the guiding surfaces G1 first, and therefore the guiding surfaces G1 may guide the second side S2 of the first leg 122 to enter the groove C1. In this way, interference generated when the scissors-leg assembly 120 and the keycap 110a are assembled may be effectively reduced, so that the fixing member 112a is prevented from being damaged or collapsing when being pressed. Herein, each of the guiding surfaces G1 may be, for example, a bevel surface or a round surface, and has, for example, a chamfered C angle (e.g., 0.2X and 0.1Y, the angle is 30 to 60 degrees, for example), but the disclosure is not limited thereto. Preferably, a distance between the two guiding surfaces G1 gradually increases in a direction close to the groove C1 to away from the groove C1. That is, the guiding surfaces G1 gradually open.

In addition, the key structure 100a of this embodiment further includes a thin-film circuit board 140 and an elastic body 150. The thin-film circuit board 140 is disposed on the base plate 130, and the elastic body 150 penetrates through the scissors-leg assembly 120 and is disposed between the keycap 110a and the thin-film circuit board 140. When a user presses down the keycap 110a, the elastic body 150 accordingly deforms to accumulate elastic potential energy and trigger a switch of the thin-film circuit board 140. When the force of pressing down the keycap 110a disappears, the elastic body 150 releases the elastic potential energy to push the keycap 110a up. The scissors-leg assembly 120 is configured to set the keycap 110a to be horizontally pressed down and pushed up. Herein, the key structure 100a may be a single-width key of a keyboard and the thin film circuit board 140 may be a membrane.

In short, since the fixing member 112a on the keycap 110a has two guiding surfaces G1, the scissors-leg assembly 120 may be assembled into the groove C1 as being guided by the two guiding surfaces G1 in this embodiment. That is, in a process of assembling, the scissors-leg assembly 120 may contact the guiding surfaces G1 first, and through the guiding provided by the guiding surfaces G1, interference may be reduced when the scissors-leg assembly 120 and the keycap 110a are assembled. Therefore, the fixing member 112a is prevented from being damaged or collapsing when being pressed. In this way, the key structure 100a of this embodiment may exhibit favorable structural reliability.

It should be noted that the reference numerals and a part of the contents in the previous embodiment are used in the following embodiments, in which identical reference numerals indicate identical or similar components, and repeated description of the same technical contents is omitted. Please refer to the descriptions of the previous embodiment for the omitted contents, which will not be repeated hereinafter.

Figure 2A:
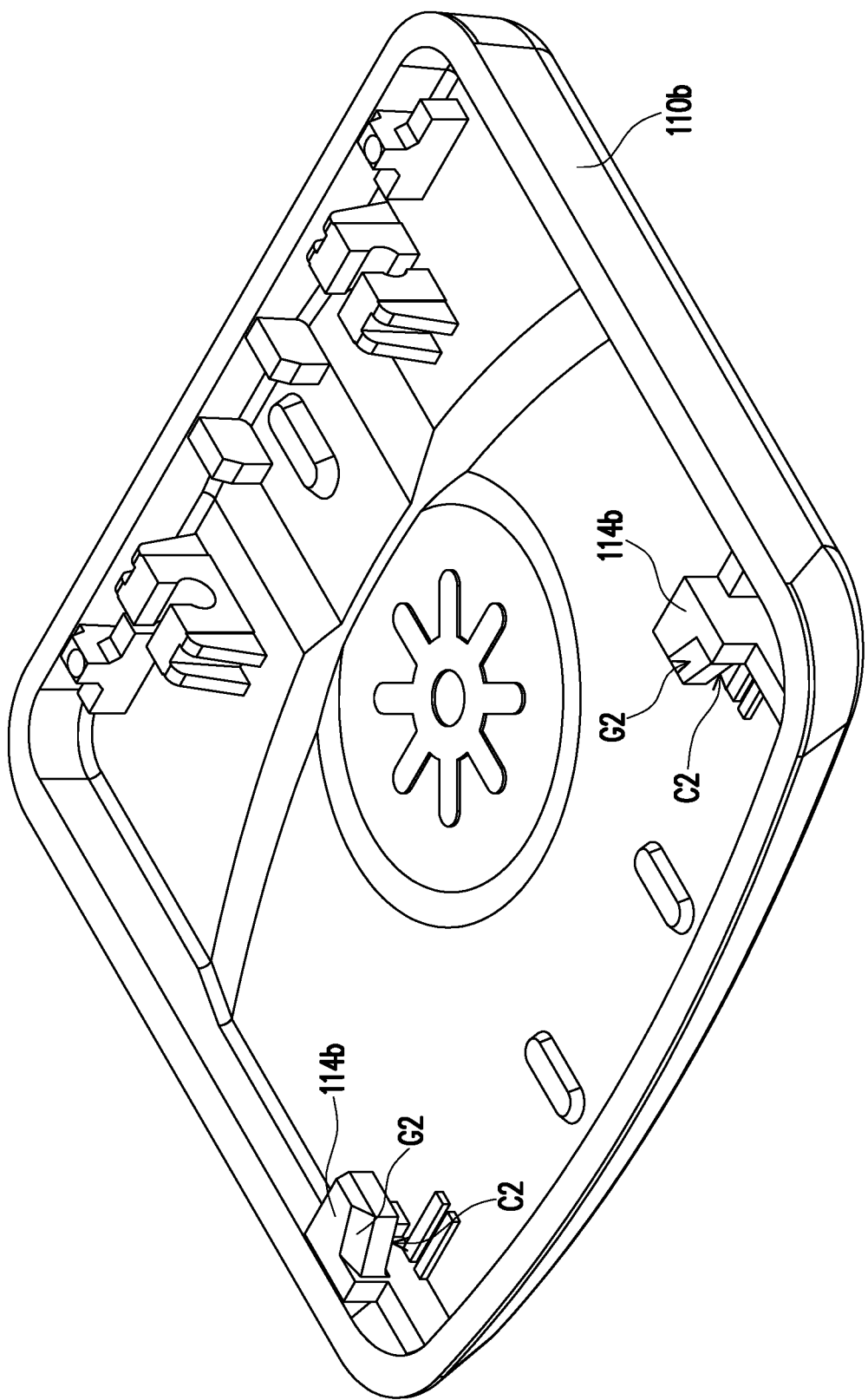
FIG. 2A is a schematic three-dimensional view of a keycap of a key structure according to another embodiment of the disclosure.
Figure 2B:
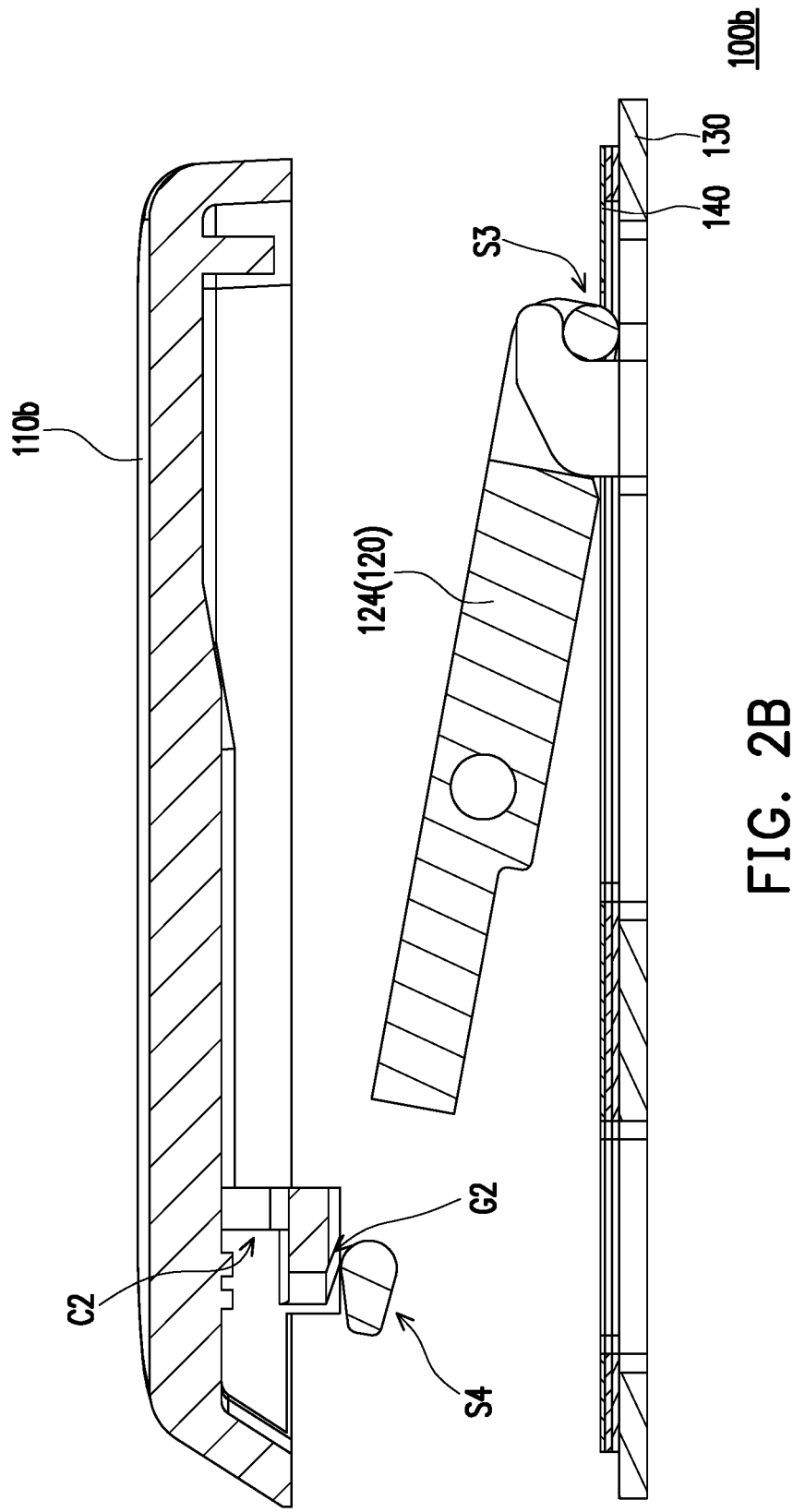
FIG. 2B is a schematic cross-sectional view before a second leg of a compressible supporting mechanism is assembled to a slidable connecting member of the keycap of FIG. 2A.
Figure 2C:
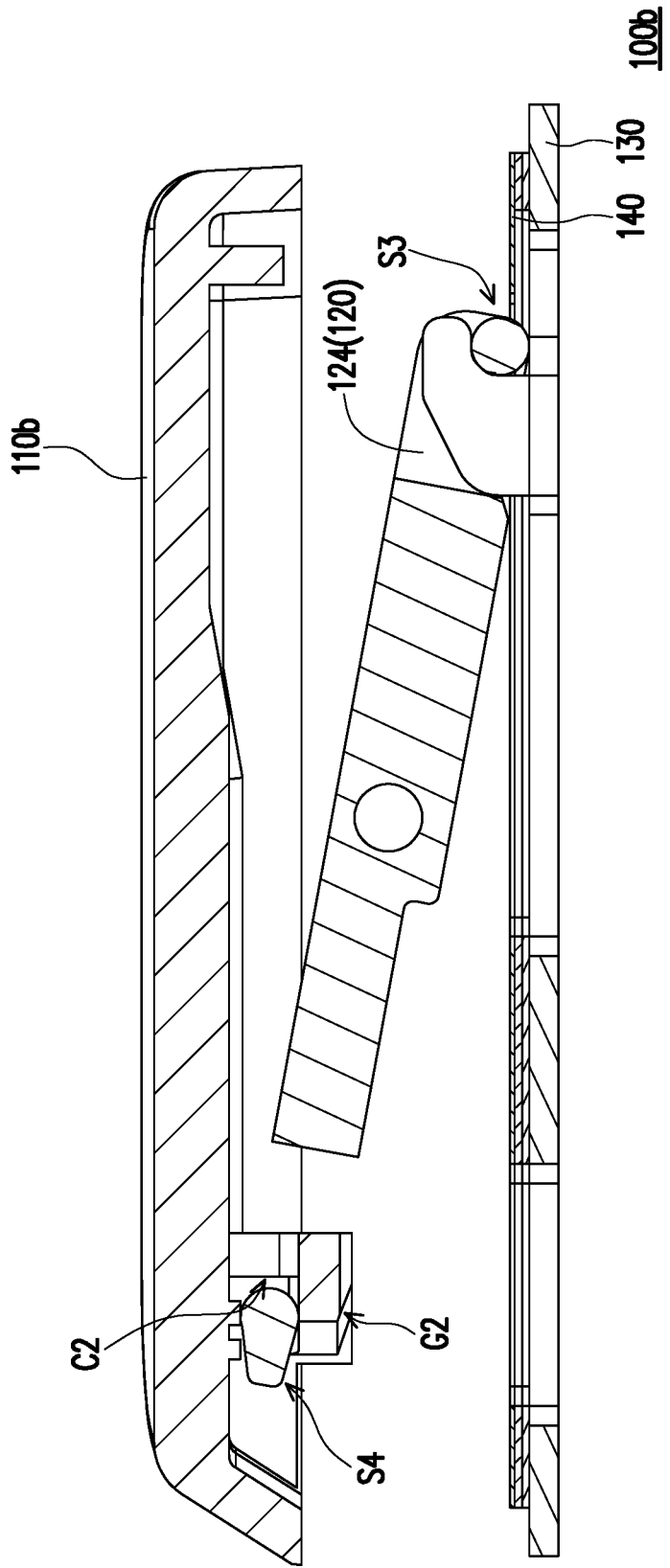
FIG. 2C is a schematic cross-sectional view after the second leg of the lifting member is assembled to the slidable connecting member of the keycap of FIG. 2A.

FIG. 2A is a schematic three-dimensional view of a keycap of a key structure according to another embodiment of the disclosure. FIG. 2B is a schematic cross-sectional view before a second leg of a compressible supporting mechanism is assembled to a slidable connecting member of the keycap of FIG. 2A. FIG. 2C is a schematic cross-sectional view after the second leg of the lifting member is assembled to the slidable connecting member of the keycap of FIG. 2A. With reference to FIG. 1B and FIG. 2A together, a keycap 110b of a key structure 100b of this embodiment is similar to the keycap 110a of FIG. 1B, and the difference therebetween lies in that: the bonding member of this embodiment is implemented as a slidable connecting member 114b (two slidable connecting members 114b are schematically depicted).

In detail, with reference to FIG. 2A, FIG. 2B, and FIG. 2C together, each of the slidable connecting members 114b has a groove C2 and a guiding surface G2. A third side S3 of the second leg 124 is pivotally connected to the base plate 130, and a fourth side S4 of the second leg 124 is assembled into groove C2 as being guided by the guiding surface G2 of each of the slidable connecting members 114b. That is, when the scissors-leg assembly 120 and the keycap 110b are assembled, the fourth side S4 of the second leg 124 contacts the guiding surface G2 first, and the guiding surface G2 may guide the fourth side S4 of the second leg 124 to enter the groove C2. In this way, interference may be effectively reduced when the scissors-leg assembly 120 and the keycap 110b are assembled, so that the slidable connecting member 114b is prevented from being damaged or collapsing when being pressed. Herein, the guiding surface G2 may be, for example, a bevel surface or a round surface, and has, for example, a chamfered C angle (e.g., 0.2X and 0.1Y, the angle is 30 to 60 degrees, for example), but the disclosure is not limited thereto.

Figure 3:
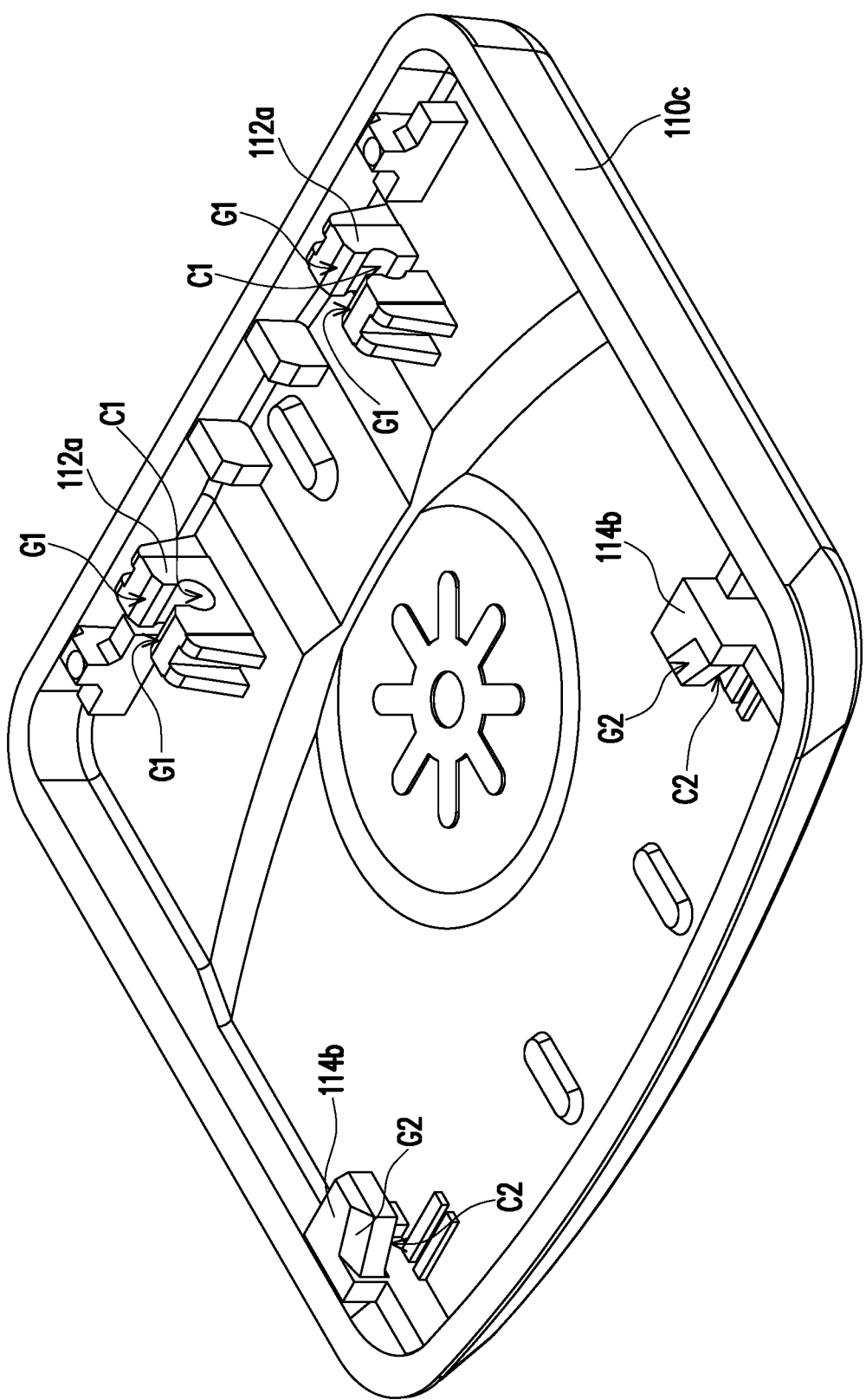
FIG. 3 is a schematic three-dimensional view of a keycap of a key structure according to another embodiment of the disclosure.

FIG. 3 is a schematic three-dimensional view of a keycap of a key structure according to another embodiment of the disclosure. With reference to FIG. 1B, FIG. 2A, and FIG. 3 together, a keycap 110c provided in this embodiment is similar to the keycap 110a of FIG. 1B and the keycap 110b of FIG. 2A, and the difference among the three keycaps lies in that: the bonding member of this embodiment includes the fixing member 112a and the slidable connecting member 114b. When the scissors-leg assembly 120 and the keycap 110c are assembled, the second side S2 of the first leg 122 contacts the guiding surfaces G1 (may be treated as first guiding surfaces) first, and the guiding surfaces G1 may guide the second side S2 of the first leg 122 to enter the groove C1 (may be treated as a first groove) (see FIG. 1C). Moreover, the fourth side S4 of the second leg 124 contacts the guiding surface G2 (may be treated as a second guiding surface) first (see FIG. 2B), and the guiding surface G2 may guide the fourth side S4 of the second leg 124 to enter the groove C2 (may be treated as a second groove) (see FIG. 2C). In this way, interference generated when the scissors-leg assembly 120 and the keycap 110c are assembled may be effectively reduced, so that the fixing member 112a and the slidable connecting member 114b are prevented from being damaged or collapsing when being pressed.

Figure 4A:
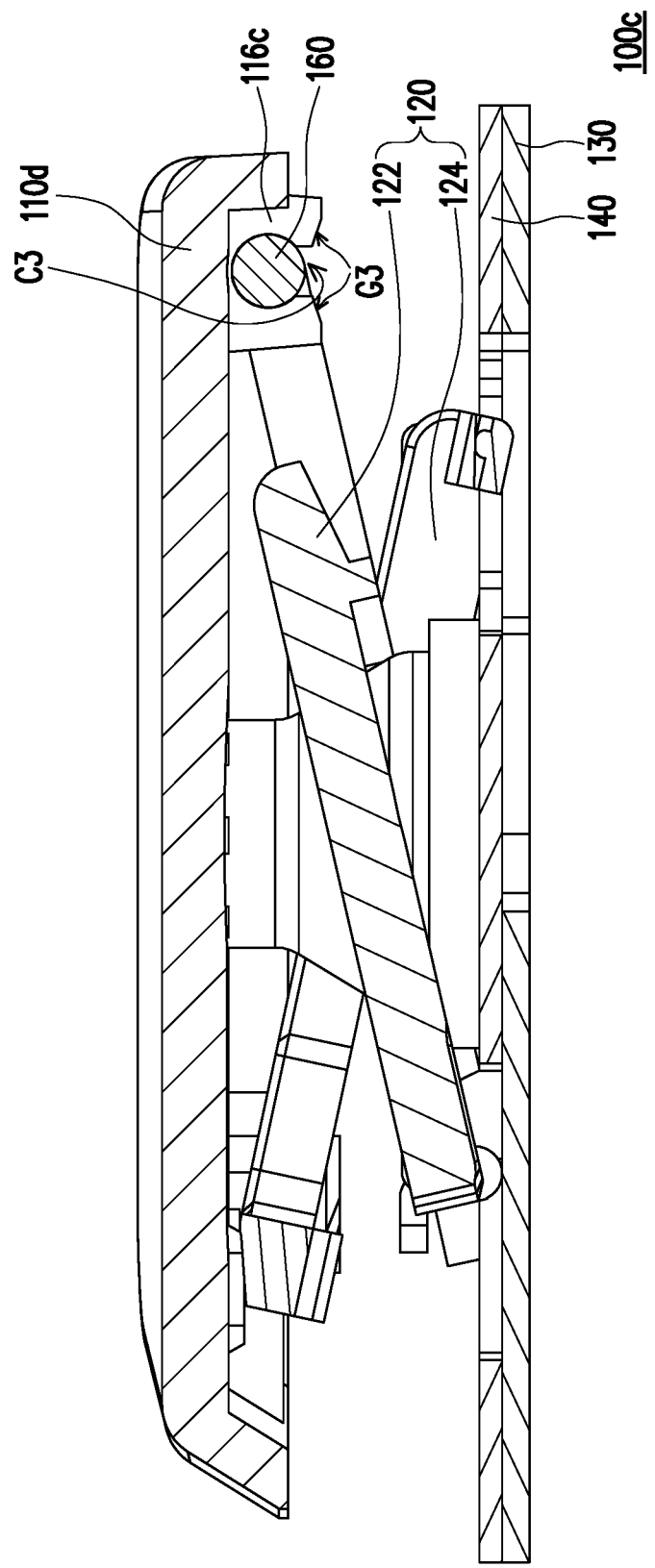
FIG. 4A is a schematic cross-sectional view of a key structure according to another embodiment of the disclosure.
Figure 4B:
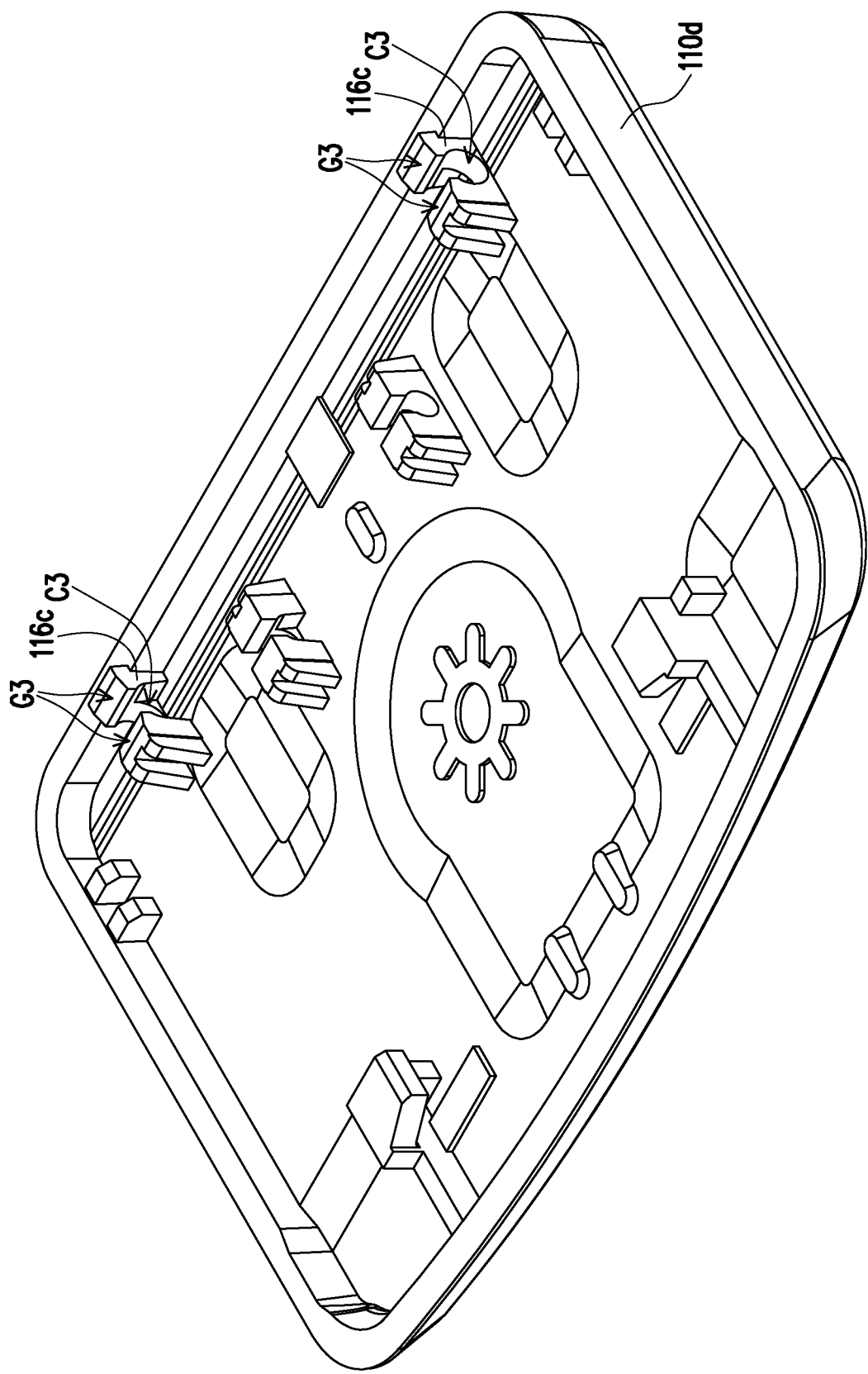
FIG. 4B is a schematic three-dimensional view of a keycap of the key structure of FIG. 4A.

FIG. 4A is a schematic cross-sectional view of a key structure according to another embodiment of the disclosure. FIG. 4B is a schematic three-dimensional view of a keycap of the key structure of FIG. 4A. With reference to FIG. 1B, FIG. 4A, and FIG. 4B together, a key structure 100c of this embodiment is similar to the key structure 100a of FIG. 1B, and the difference therebetween lies in that: the compressible supporting mechanism of this embodiment is implemented as a balancing bar 160, and the bonding member is implemented as a positioning member 116c. When the balancing bar 160 and the keycap 110d are assembled, the balancing bar 160 is assembled into a groove C3 as being guided by guiding surfaces G3. In this way, interference generated when the balancing bar 160 and the keycap 110d are assembled may be effectively reduced, so that the positioning member 116c is prevented from being damaged or collapsing when being pressed. Herein, each of the guiding surfaces G3 may be, for example, a bevel surface or a round surface, and has, for example, a chamfered C angle (e.g., 0.2X and 0.1Y, the angle is 30 to 60 degrees, for example), but the disclosure is not limited thereto. Preferably, a distance between the two guiding surfaces G3 gradually increases in a direction away from the groove C3. That is, the guiding surfaces G3 gradually open.

Figure 5A:
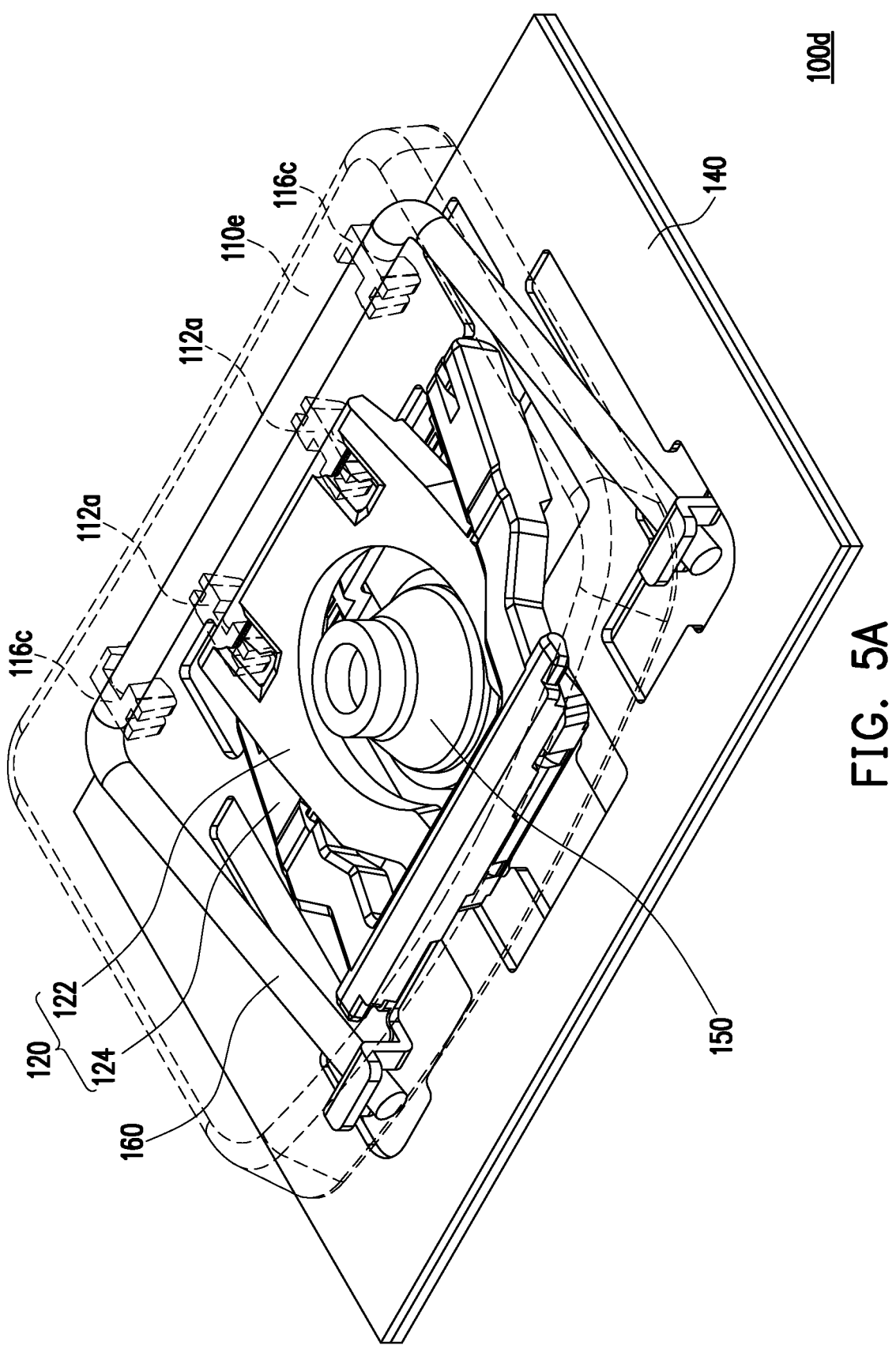
FIG. 5A is a schematic three-dimensional view of a key structure according to another embodiment of the disclosure.
Figure 5B:
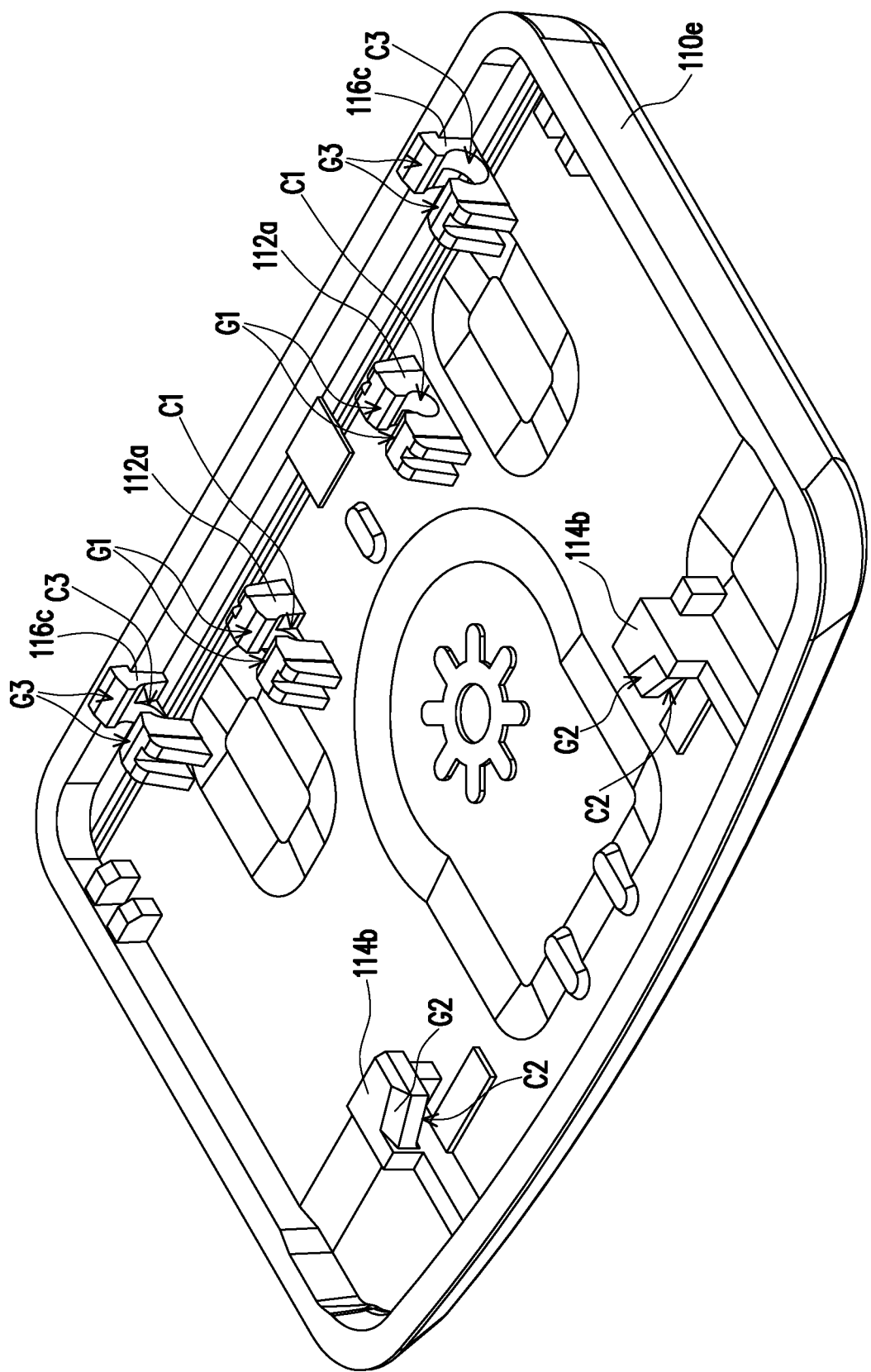
FIG. 5B is a schematic three-dimensional view of a keycap of the key structure of FIG. 5A.
Figure 5C:
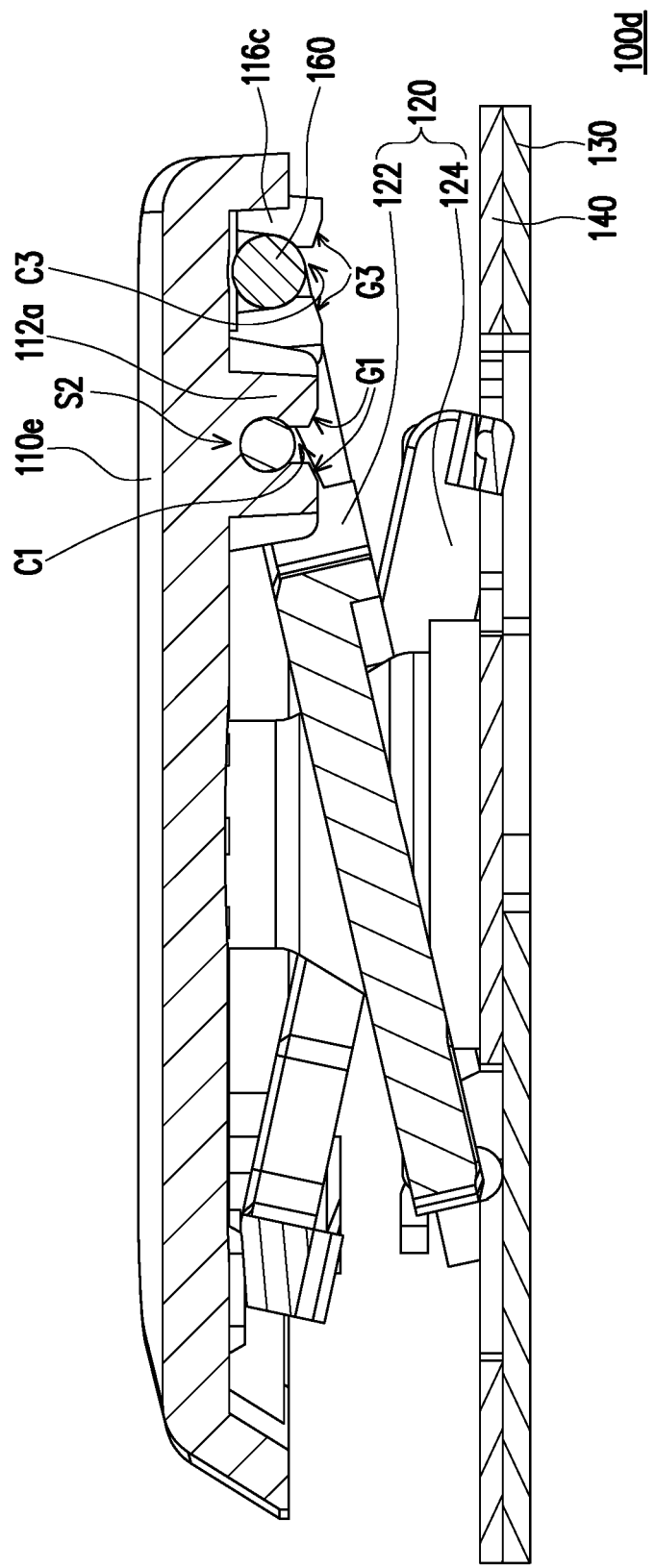
FIG. 5C is a schematic cross-sectional view of the key structure of FIG. 5A.

FIG. 5A is a schematic three-dimensional view of a key structure according to another embodiment of the disclosure. FIG. 5B is a schematic three-dimensional view of a keycap of the key structure of FIG. 5A. FIG. 5C is a schematic cross-sectional view of the key structure of FIG. 5A. For the convenience of the description, the keycap in FIG. 5A is illustrated in dotted lines. With reference to FIG. 5A, FIG. 5B, and FIG. 5C together, a key structure 100d of this embodiment is similar to the key structures 100a, 100b, and 100c, and the difference therebetween lies in that: the compressible supporting mechanism of this embodiment includes the scissors-leg assembly 120 and the balancing bar 160, and the bonding member includes the fixing member 112a, the slidable connecting member 114b, and the positioning member 116c. Herein, the key structure 100d is implemented as a multiple-width key of a keyboard, so that the key structure 100d includes the balancing bar 160 configured to balance movement of the compressible supporting mechanism 120 towards the base plate 130. The multiple-width key maybe a space bar.

In detail, in this embodiment, the positioning member 116c is closer to an edge of the keycap 110c than the fixing member 112a. Herein, each positioning member 116c has the groove C3 (may be treated as a third groove) and the two guiding surfaces G3 (may be treated as third guiding surfaces) located at two sides of the groove C3. When the scissors-leg assembly 120 and the keycap 110c are assembled, the second side S2 of the first leg 122 contacts the guiding surfaces G1 (may be treated as the first guiding surfaces) first, and the guiding surfaces G1 may guide the second side S2 of the first leg 122 to enter the groove C1 (may be treated as the first groove) (see FIG. 1C). Moreover, the fourth side S4 of the second leg 124 contacts the guiding surface G2 (may be treated as the second guiding surface) first (see FIG. 2B), and the guiding surface G2 may guide the fourth side S4 of the second leg 124 to enter the groove C2 (may be treated as the second groove) (see FIG. 2C). When the balancing bar 160 and the keycap 110c are assembled, the balancing bar 160 may contact the guiding surfaces G3 first, and the guiding surfaces G3 may guide the balancing bar 160 to enter the groove C3 (see FIG. 5C). In this way, interference generated when the scissors-leg assembly 120 and the keycap 110c are assembled and interference generated when the balancing bar 160 and the keycap 110c are assembled may be effectively reduced, so that the fixing member 112a, the slidable connecting member 114b, and the positioning member 116c are prevented from being damaged or collapsing when being pressed.

In view of the foregoing, in the key structure provided by the disclosure, the keycap includes the bonding member protruding from the bottom surface. Since the bonding member has the groove and the guiding surface, the compressible supporting mechanism may be assembled into the groove as being guided by the guiding surface. That is, in the assembly process, the compressible supporting mechanism is guided by the guiding surface, so interference generated when the compressible supporting mechanism and the keycap are assembled may be reduced, so that the bonding member is prevented from being damaged or collapsing when being pressed. In this way, the key structure provided by the disclosure may exhibit favorable structural reliability.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the invention.

What is claimed is:

1. A key structure, comprising:
   a base plate;
   a keycap, disposed above the base plate, the keycap having a top surface and a bottom surface opposite to each other and comprising a bonding member protruding from the base surface, wherein the bonding member has a groove and a guiding surface; and
   a compressible supporting mechanism, disposed between the base plate and the keycap, wherein the compressible supporting mechanism is assembled into the groove,
   wherein the bonding member comprises a fixing member and a slidable connecting member, the slidable connecting member and the fixing member are respectively located at two opposite sides of the keycap, the groove comprises a first groove and a second groove, the guiding surface comprises a first guiding surface and a second guiding surface, the fixing member has the first groove and the first guiding surface, and the slidable connecting member has the second groove and the second guiding surface;
   wherein the slidable connecting member comprises a top plate having a first edge, a second edge, a third edge, and a fourth edge, the first edge is closer to the fixing member than the second edge, the fourth edge is connected to the first edge and the second edge, the third edge is opposite to the fourth edge;
   wherein the slidable connecting member further comprises a stop plate protruding from the top plate and correspondingly aligned with the first edge, the second guiding surface is disposed on the top plate and connected to the second edge and the third edge, and the second guiding surface is not connected to the first edge and has a coverage exceeding half of the second edge.

2. The key structure according to claim 1, wherein the guiding surface comprises a bevel surface or a round surface.

3. The key structure according to claim 1, wherein the compressible supporting mechanism comprises a scissors-leg assembly, the scissors-leg assembly comprises a first leg and a second leg pivotally connected to each other, the first leg is located inside the second leg, and a first side of the first leg and a third side of the second leg are connected to the base plate.

4. The key structure according to claim 3, wherein a second side of the first leg is assembled into the first groove, and a fourth side of the second leg is assembled into the second groove.

5. The key structure according to claim 4, wherein the compressible supporting mechanism further comprises a balancing bar, the bonding member further comprises a positioning member, the positioning member is closer to an edge of the keycap than the fixing member, the groove further comprises a third groove, the guiding surface further comprises a third guiding surface, the positioning member has the third groove and the third guiding surface, and the balancing bar is assembled into the third groove.

6. The key structure according to claim 1, wherein the compressible supporting mechanism is a balancing bar, and the bonding member is a positioning member.

7. The key structure according to claim 1, wherein the guiding surface comprises two guiding surfaces, and a distance between the two guiding surfaces gradually increases in a direction away from the groove.

8. The key structure according to claim 1, further comprising:
   a thin-film circuit board, disposed on the base plate; and
   an elastic body, penetrating through the compressible supporting mechanism, disposed between the keycap and the thin-film circuit board.

* * * * *